(12) United States Patent
Mills et al.

(10) Patent No.: US 7,331,565 B2
(45) Date of Patent: *Feb. 19, 2008

(54) ON/OFF SOLENOID

(75) Inventors: David Mills, Lake Orion, MI (US); Scott Weber, Farmington Hills, MI (US); Howard Saxon, Clinton Township, MI (US)

(73) Assignee: BorgWarner Inc., Auburn Hills, MI (US)

( * ) Notice: Subject to any disclaimer, the term of this patent is extended or adjusted under 35 U.S.C. 154(b) by 38 days.

This patent is subject to a terminal disclaimer.

(21) Appl. No.: 10/821,740

(22) Filed: Apr. 9, 2004

(65) Prior Publication Data

US 2004/0227119 A1 Nov. 18, 2004

Related U.S. Application Data

(60) Provisional application No. 60/470,520, filed on May 14, 2003.

(51) Int. Cl.
*F16K 31/02* (2006.01)

(52) U.S. Cl. .............................. 251/129.14; 137/625.65

(58) Field of Classification Search ........... 251/129.14, 251/129.15, 129.21; 137/625.64, 625.65
See application file for complete search history.

(56) References Cited

U.S. PATENT DOCUMENTS

| | | | | | |
|---|---|---|---|---|---|
| 3,856,260 | A | * | 12/1974 | Giordano ................ | 251/129.14 |
| 4,592,533 | A | * | 6/1986 | Guglielmi et al. ........ | 251/30.01 |
| 4,807,846 | A | * | 2/1989 | Greiner et al. ......... | 251/129.15 |
| 4,998,559 | A | | 3/1991 | McAuliffe, Jr. | |
| 5,346,176 | A | * | 9/1994 | Fujimoto et al. ...... | 251/129.15 |
| 6,029,703 | A | * | 2/2000 | Erickson et al. ....... | 137/625.61 |
| 6,336,470 | B1 | * | 1/2002 | Zapf ..................... | 137/625.65 |
| 6,343,621 | B1 | | 2/2002 | Holmes et al. | |
| 6,918,570 | B2 | * | 7/2005 | Ahn ..................... | 251/129.15 |

\* cited by examiner

*Primary Examiner*—John Rivell
*Assistant Examiner*—John K. Fristoe, Jr.
(74) *Attorney, Agent, or Firm*—Warn Partners. P.C.

(57) ABSTRACT

A solenoid control valve is described wherein the valve employs a precision molded plastic valve seat member, a corresponding control valve body which includes flying buttresses for supporting and distributing loads on the control valve body, and armature vent features.

21 Claims, 8 Drawing Sheets

FIG. 14

ON/OFF SOLENOID

CROSS-REFERENCE TO RELATED APPLICATION

The instant application claims priority to U.S. Provisional Patent Application Ser. No. 60/470,520, filed May 14, 2003, the entire specification of which is expressly incorporated herein by reference.

FIELD OF THE INVENTION

The present invention generally relates to solenoid control valves, and more particularly to an on/off solenoid control valve for controlling hydraulic functions of a transmission for a vehicle.

BACKGROUND OF THE INVENTION

Various solenoid designs have been used in the automotive industry, including those for use in conjunction with automatic transmission systems. For example, automatic transmission control systems generally employ solenoids in order to control the pressure and flow of the transmission fluid. In this manner, the control of transmission fluid pressure can be used to engage and disengage a transmission clutch in response to an electrical input signal supplied to the solenoid, or the control of transmission fluid pressure can be used to maintain transmission line pressure.

Generally, solenoids employ a solenoid control valve to aid in the regulation of the fluid flow by the solenoid. An example of a solenoid control valve can be found in U.S. Pat. No. 4,998,559 to McAuliffe, Jr., the entire specification of which is incorporated herein by reference.

Some solenoid control valves typically include a valve seat member and a corresponding control valve body. Although conventional solenoid control valves have been somewhat successful in meeting the demands of the automotive industry, these solenoid control valves can be further improved upon, e.g., in the areas of cost, quality, performance, and the like.

Accordingly, there exists a need for new and improved solenoid control valves, including but not limited to new and improved valve seat members, armature members, and control valve bodies.

SUMMARY OF THE INVENTION

In accordance with the general teachings of the present invention, a new and improved solenoid control valve is provided.

In accordance with one aspect of the present invention, the solenoid control valve advantageously makes use of a precision molded plastic valve seat member, a corresponding control valve body which includes flying buttresses for supporting and distributing loads on the control valve body, and armature vent features.

In accordance with a first embodiment of the present invention, a solenoid fluid control valve is provided, comprising: (1) a fluid control body adapted for being received in a fluid housing, said fluid control body including a central cavity, and having a pressure supply passage at a first end and a radially extending pressure control passage; (2) a feed supply tube positioned in said central cavity, said feed supply tube including an outer diameter in communication with said pressure control passage, and including an inner bore operably connected to said pressure supply passage, said feed supply tube being supported in said central cavity of said fluid control body by at least one flying buttress structure interposed therebetween, said feed supply tube including a valve receiving chamber area; (3) a valve seat portion being made of a plastic material and press fit onto said control body, said valve seat portion including a valve seat and a passage in communication between said valve seat and said pressure control passage; (4) a valve contained in said valve receiving chamber area for closing off communication between said pressure supply passage and said pressure control passage; and (5) a solenoid for opening said valve in response to a signal.

In accordance with a second embodiment of the present invention, a solenoid fluid control valve is provided, comprising: (1) a fluid control body adapted for being received in a fluid housing, said fluid control body including a central cavity, and having a pressure supply passage at a first end and a radially extending pressure control passage; (2) a feed supply tube positioned in said central cavity, said feed supply tube including an outer diameter in communication with said pressure control passage, and including an inner bore operably connected to said pressure supply passage, said feed supply tube being supported in said central cavity of said control body by at least one flying buttress structure interposed therebetween, said feed supply tube including a valve receiving chamber area; (3) a valve seat portion being made of a plastic material and press fit onto said control body, said valve seat portion including a valve seat and a passage in communication between said valve seat and said pressure control passage; (4) a valve contained in said valve receiving chamber for closing off communication between said pressure supply passage and said pressure control passage; (5) a solenoid for opening said valve in response to a signal, said solenoid including a central axis and having a coil wound around a bobbin, spaced from and positioned around said central axis, said coil having radially stepped radial inner diameters; (6) a casing member for attaching said solenoid to said control body; a portion of said casing member extending into the stepped portion of said coil for forming a flux tube therein, said bobbin including a "C" shaped integrally molded retention ring; and (7) an armature axially movable within said bobbin.

In accordance with a third embodiment of the present invention, a solenoid fluid control valve is provided, comprising: (1) a fluid control body adapted for being received in a fluid housing, said fluid control body including a central cavity, and having a pressure supply passage at a first end and a radially extending pressure control passage; (2) a feed supply tube positioned in said central cavity, said feed supply tube including an outer diameter in communication with said pressure control passage, and including an inner bore operably connected to said pressure supply passage, said feed supply tube including a valve receiving area; (3) a valve seat portion being made of a plastic material and press fit onto said control body, said valve seat portion including a valve seat and a passage in communication between said valve seat and said pressure control passage; (4) a valve contained in said valve receiving chamber for closing off communication between said pressure supply passage and said pressure control passage; (5) a solenoid for opening said valve in response to a signal, said solenoid including a central axis and having a coil wound around a bobbin, spaced from and positioned around said central axis, said coil having radially stepped radial inner diameters; (6) a casing member for attaching said solenoid to said control body; (7) a pole piece adjacent said armature and interposed between said bobbin and said fluid control body; (8) a flux tube secured by said casing member, said flux tube including a support portion extending therefrom; and (9) an armature axially movable within said bobbin.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring generally to the Figures, and more specifically to FIGS. 1-3, 5 and 6, there is provided a solenoid control valve generally shown at 10, in accordance with the general teachings of the present invention. The solenoid control valve 10 preferably includes a fluid control valve body generally indicated at 12, and an electromagnetic solenoid portion generally indicated at 14. By way of a non-limiting example, the fluid control body 12 is preferably adapted for being received in a fluid control housing in a valve body of a transmission.

The fluid control body 12 preferably includes a central cavity 16, wherein the central cavity 16 preferably includes a fluid supply passage 18 and a fluid control passage 20. These passages 18, 20, respectively, preferably communicate with either a supply line in the manifold or a control line, as is readily known in the art.

Figures 4, 5:
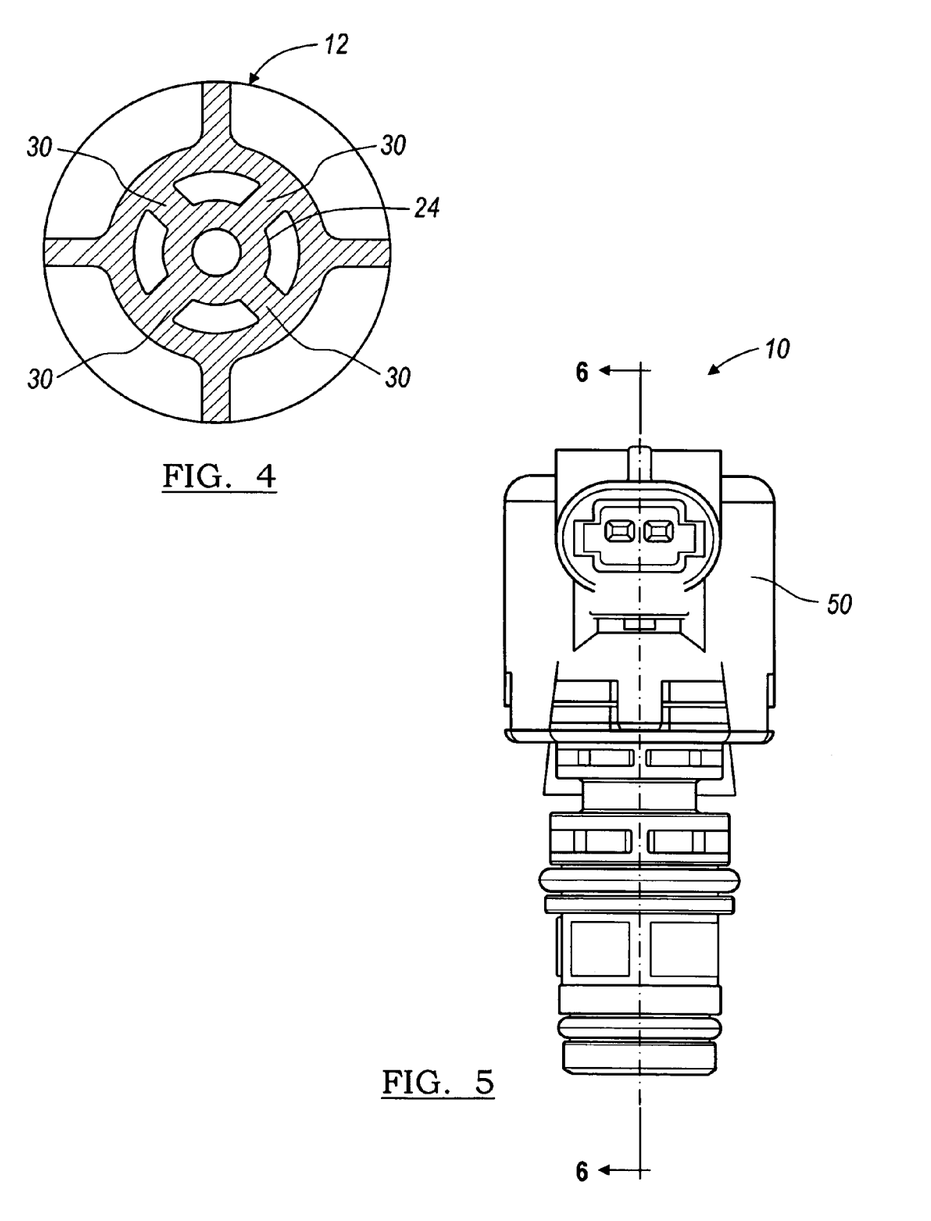
FIG. 4 is a sectional view taken along line 4-4 of FIG. 3.
FIG. 5 is a rear plan view of the solenoid control valve of the present invention.

A feed supply tube 22 is preferably integrally molded with the fluid control valve body 12. Feed supply tube 22 preferably includes an outer diameter 24. The outer diameter 24 is preferably in direct communication with the control passage 20, and feed supply tube 22 preferably includes an inner bore 26 in communication with and forming a portion of the supply passage 18 that additionally connects through laterally extending port 28. The feed supply tube 22 is preferably supported in the cavity 16 by at least one or more flying buttress supports 30. Although FIG. 4 depicts four flying buttress supports 30, it should be appreciated that less than, or more than, this number of buttresses may be used in the practice of the present invention. The feed supply tube 22 preferably includes a valve seat receiving area 32.

Referring specifically to FIGS. 3, 3A, 6, 7 and 8, a valve seat member 34 is preferably made out of plastic and is press fit over the valve seat receiving area 32. By this arrangement, fluid passage is allowed axially between the buttresses 30, while side loads on the valve seat member 34 are directed to the thicker base of the ribs where they are better absorbed. An alignment shelf 36 is preferably provided on the fluid control valve body 12 for providing proper depth of alignment of the valve seat member 34. A ball valve 38 is preferably held between the valve seat 40 and the valve seat receiving area 32. The valve seat member 34 preferably provides a passageway 42 to the fluid control passage 20. The ball valve 38 is preferably operable to selectively cut off supply of flow from the pressure supply channel 18 to the pressure control passage 20. The first step of the path of fluid flow is that fluid enters into the lateral extending support 28 from outside of the solenoid control valve 10. The fluid then flows through the fluid supply passage 18 and into inner bore 26. Once the fluid enters the inner bore 26, the fluid will flow through ball valve 38, through passageway 42, and into the control passage 20. The solenoid control valve 10 is configured such that the lateral extending support 28 and the control passage 20 only communicate fluid through ball valve 38.

The valve seat member 34 preferably includes three wing members 35 which extend radially therefrom for securing the valve seat member 34 between the lower surface of the pole piece 62 and the shelf 36. In accordance with a preferred embodiment of the present invention, it is generally necessary to provide a plastic part of very close tolerances such that the distance between the valve seat 40 and the upper surface of at least one, and more preferably all, of the wing members 35 are maintained to a tolerance of ±0.025 mm or better.

Figures 1, 2:
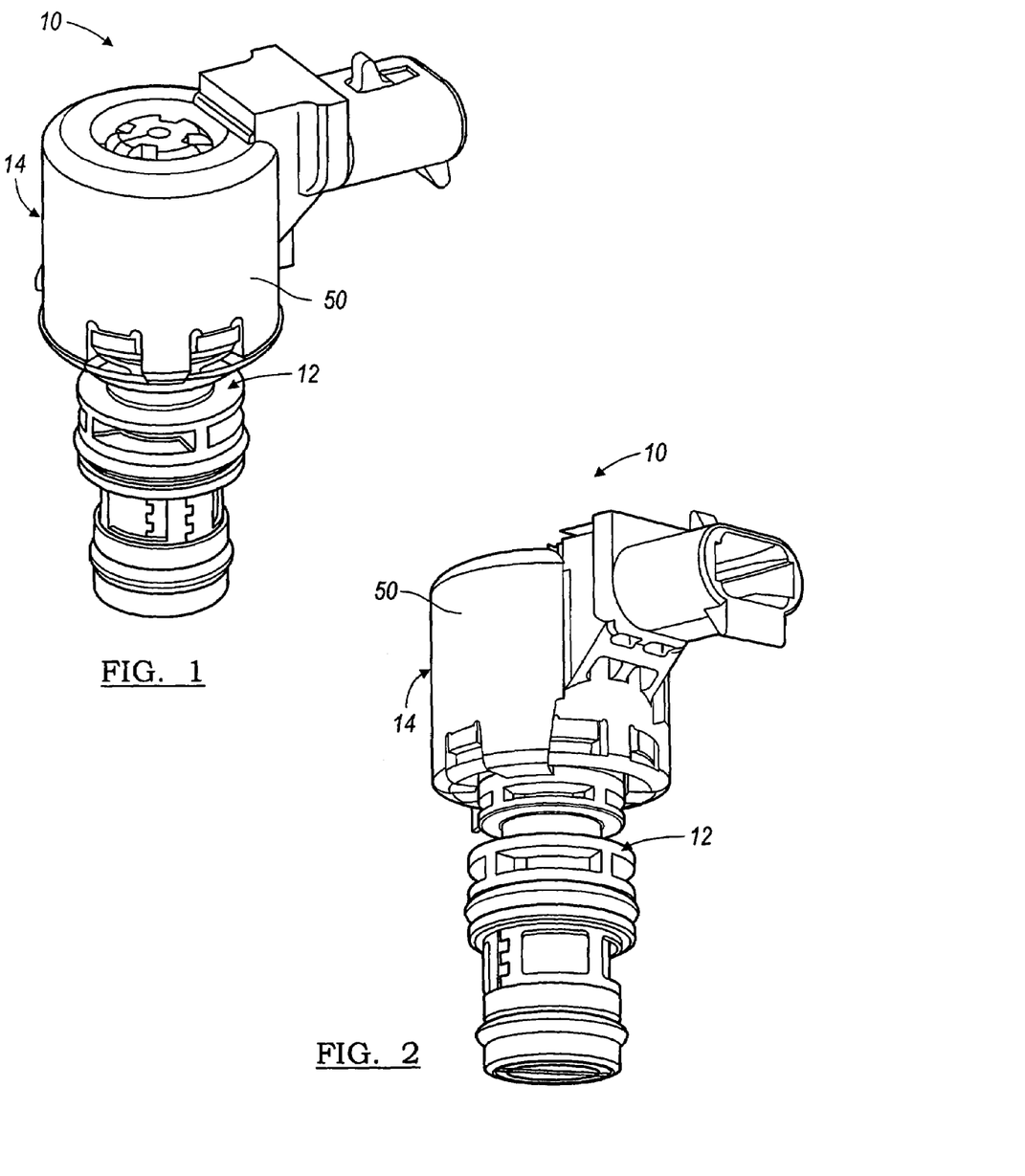
FIG. 1 is a front perspective view of the present invention.
FIG. 2 is a rear perspective view of the solenoid control valve of the present invention.
Figures 3, 3A:
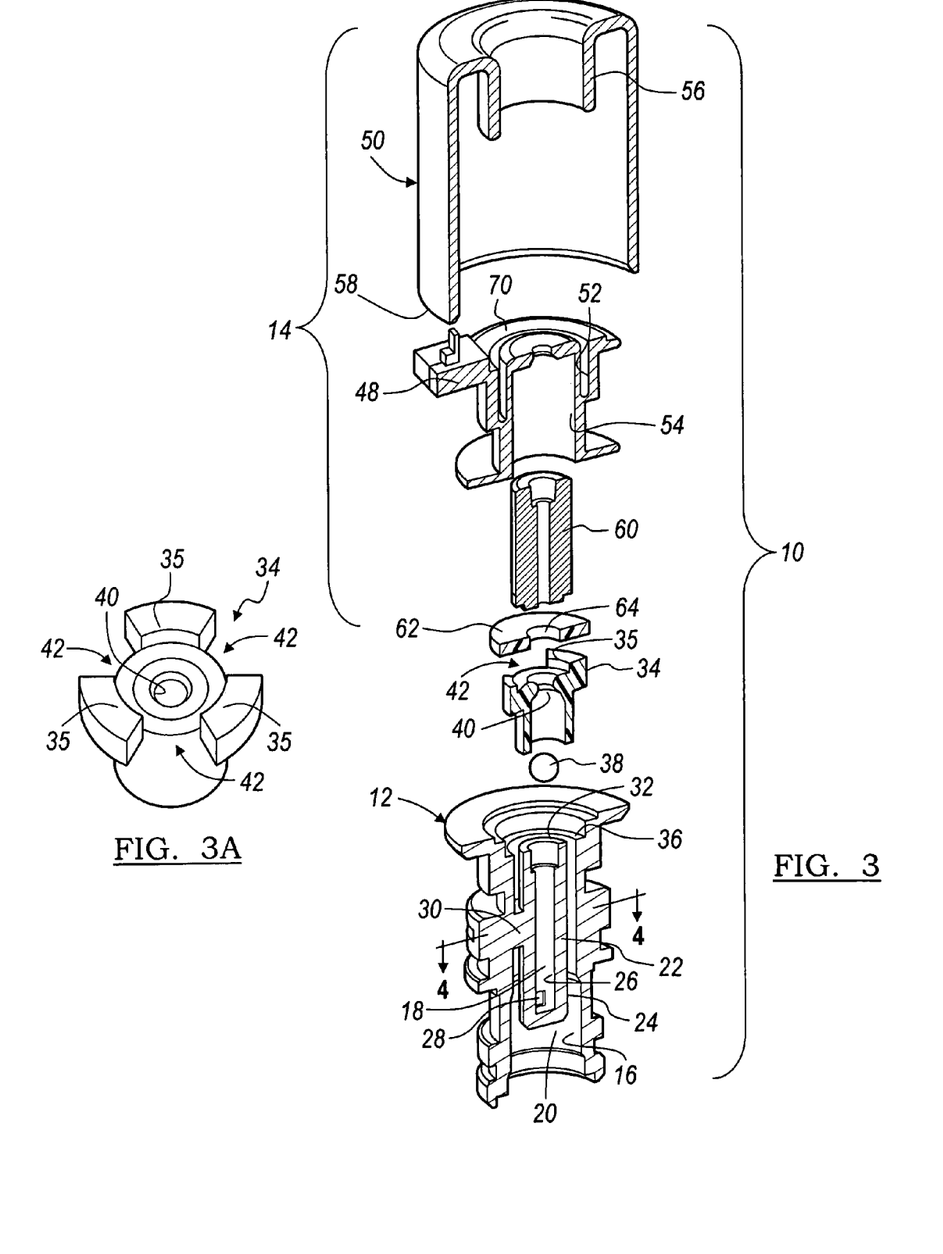
FIG. 3 is an exploded partial sectional view of the solenoid control valve of the present invention.
FIG. 3A is a perspective view of valve seat member of the present invention.
Figure 6:
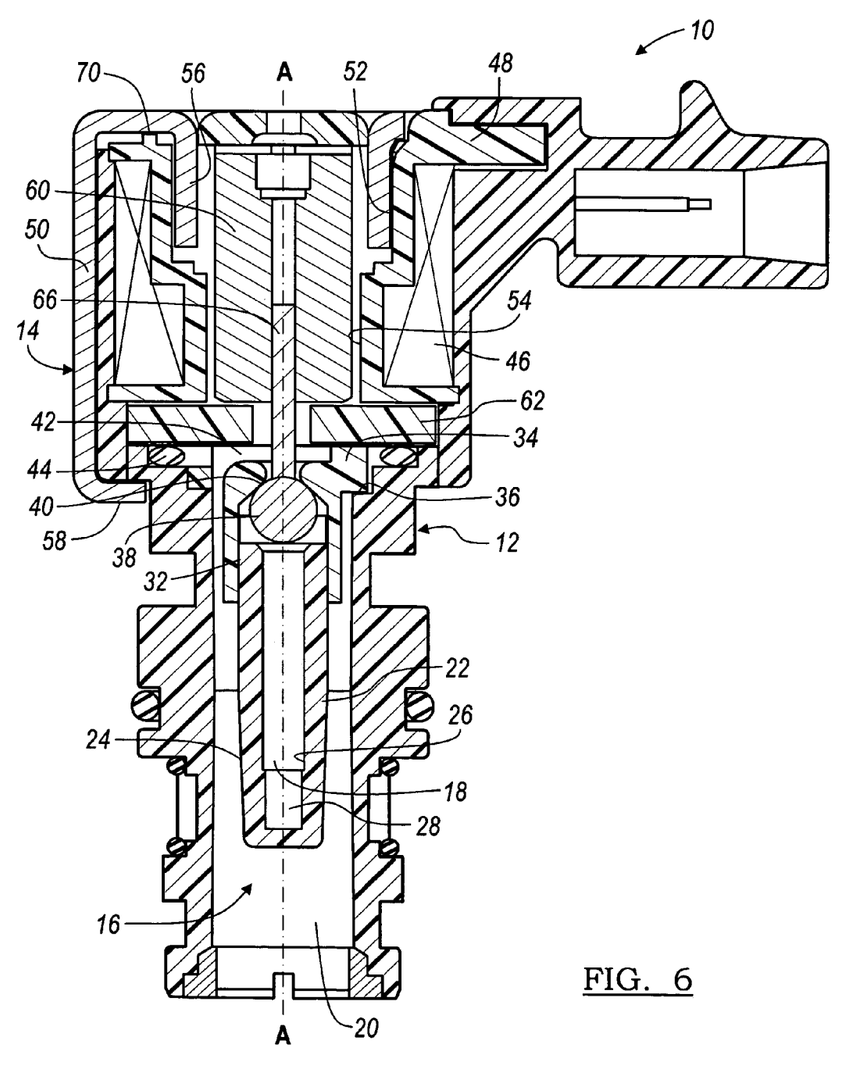
FIG. 6 is a sectional view taken along line 6-6 of FIG. 5.
Figure 7:
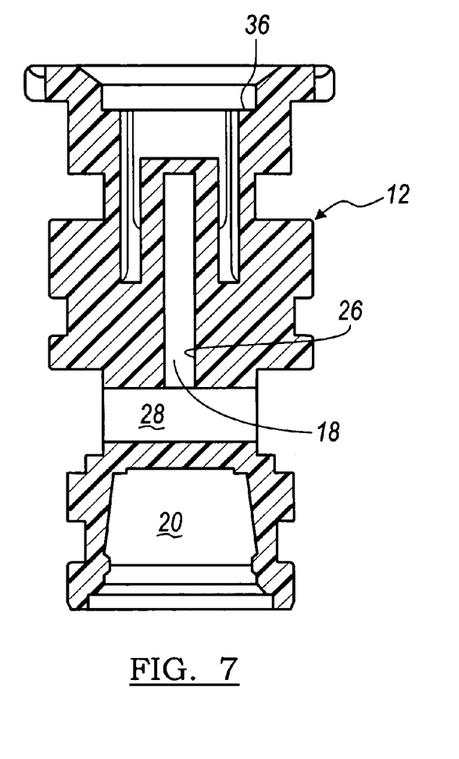
FIG. 7 is a sectional view of the fluid control body of the present invention.
Figure 8:
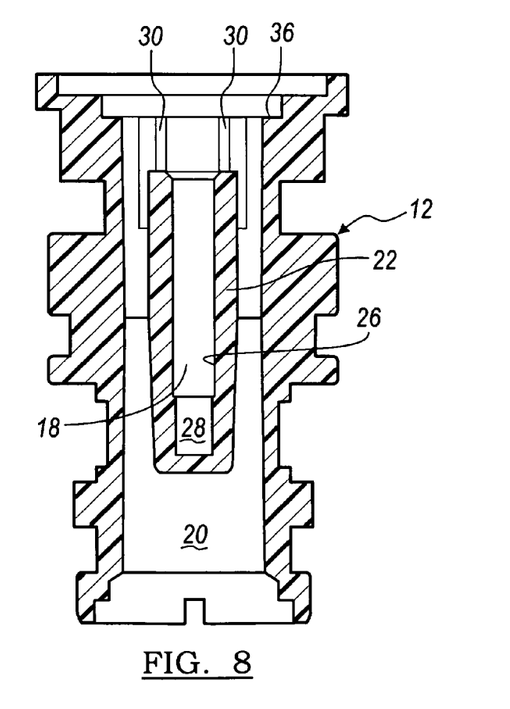
FIG. 8 is a second sectional view of the fluid control body of the present invention.
Figures 9, 10:
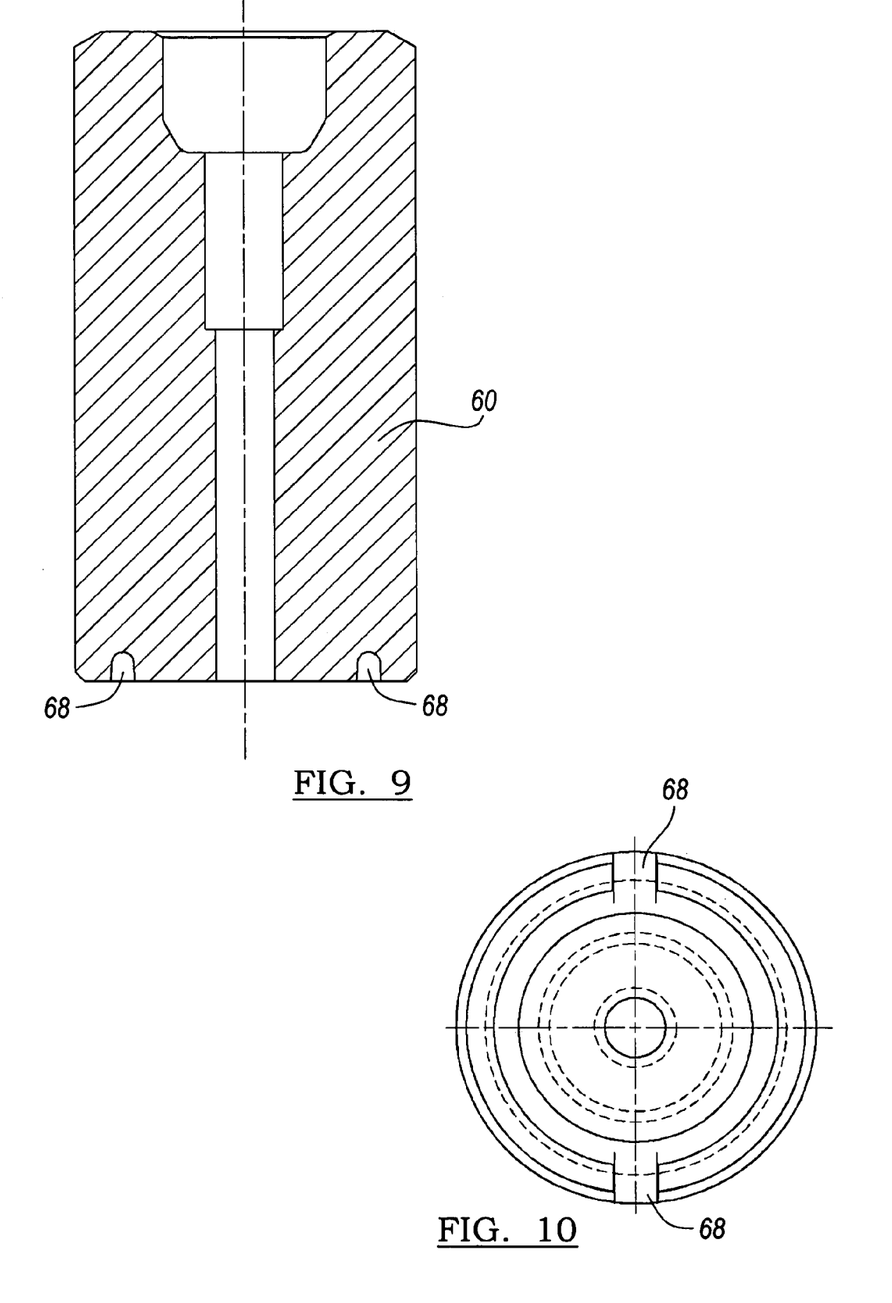
FIG. 9 is a sectional view of the armature of the present invention.
FIG. 10 is a bottom plan view of the armature of the present invention.

The solenoid portion 14 is preferably secured to the fluid control body 12. An O-ring 44 is preferably disposed between the fluid control body 12 and the pole piece 62. The solenoid portion 14 preferably includes a central axis A-A and has a coil 46 wound around a non-magnetic bobbin member 48. The bobbin member 48 is preferably stepped radially, and includes a radially outward wall 52 and a radially inward wall 54. A one-piece casing member 50 preferably includes a radially extending flux tube forming annular portion 56. The casing 50 also preferably crimpingly attaches the solenoid portion 14 to the fluid control body 12 by way of the crimped portion 58.

Referring specifically to FIGS. 3, 6, 9 and 10, an armature 60 is preferably provided, which fits within the wall 54 and is axially movable in response to a current in the coil 46. The pole piece 62 is secured between the lower portion of the bobbin 48 and the fluid control body 12. The pole piece 62 preferably includes a center orifice 64, which allows the control rod 66 to actuate the ball member 38. In accordance with a preferred embodiment of the present invention, the armature 60 is preferably provided with at least one, and more preferably at least two, semi-circular pressure relief vents 68 formed in the lower portion of the armature 60 so as to preferably control pressure build up and prevent extra pressure during solenoid actuations. This beneficially increases net force and improves precise solenoid performance.

Figure 11:
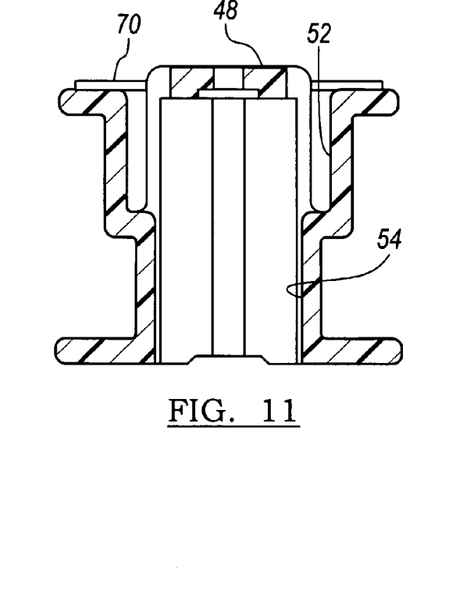
FIG. 11 is a sectional view of the bobbin of the present invention.
Figure 12:
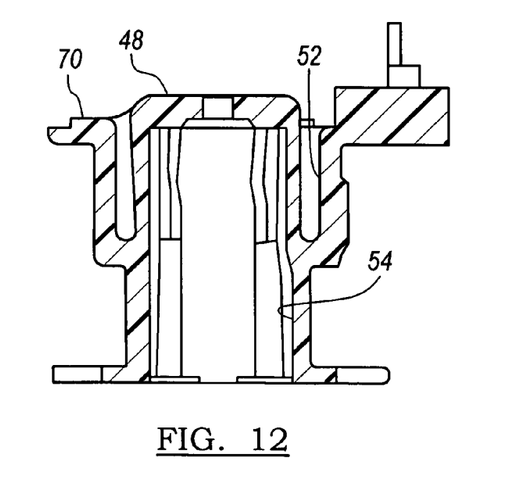
FIG. 12 is a second sectional view of the bobbin of the present invention.
Figure 13:
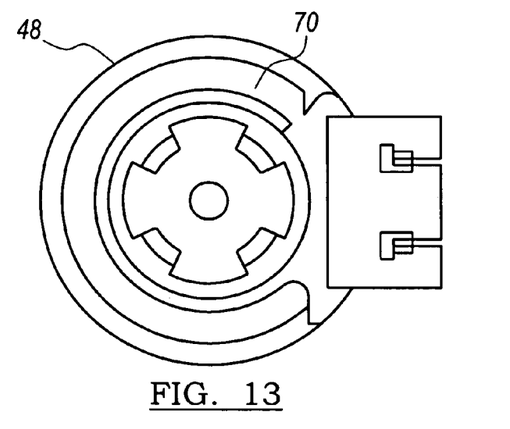
FIG. 13 is a top plan view of the bobbin of the present invention.

Referring specifically to FIGS. 11-13, bobbin 48 also preferably includes an integrally molded spacer portion 70. This "C" shaped spacer preferably provides for precision alignment and load bearing during final assembly. In the past, separate spacers were used, resulting in potential operation fluctuations due to shifting components during final assembly. The integral spacer 70 of the present invention reduces inconsistencies due to shifting components inherent in manufacture when using separate spacers.

Figure 14:
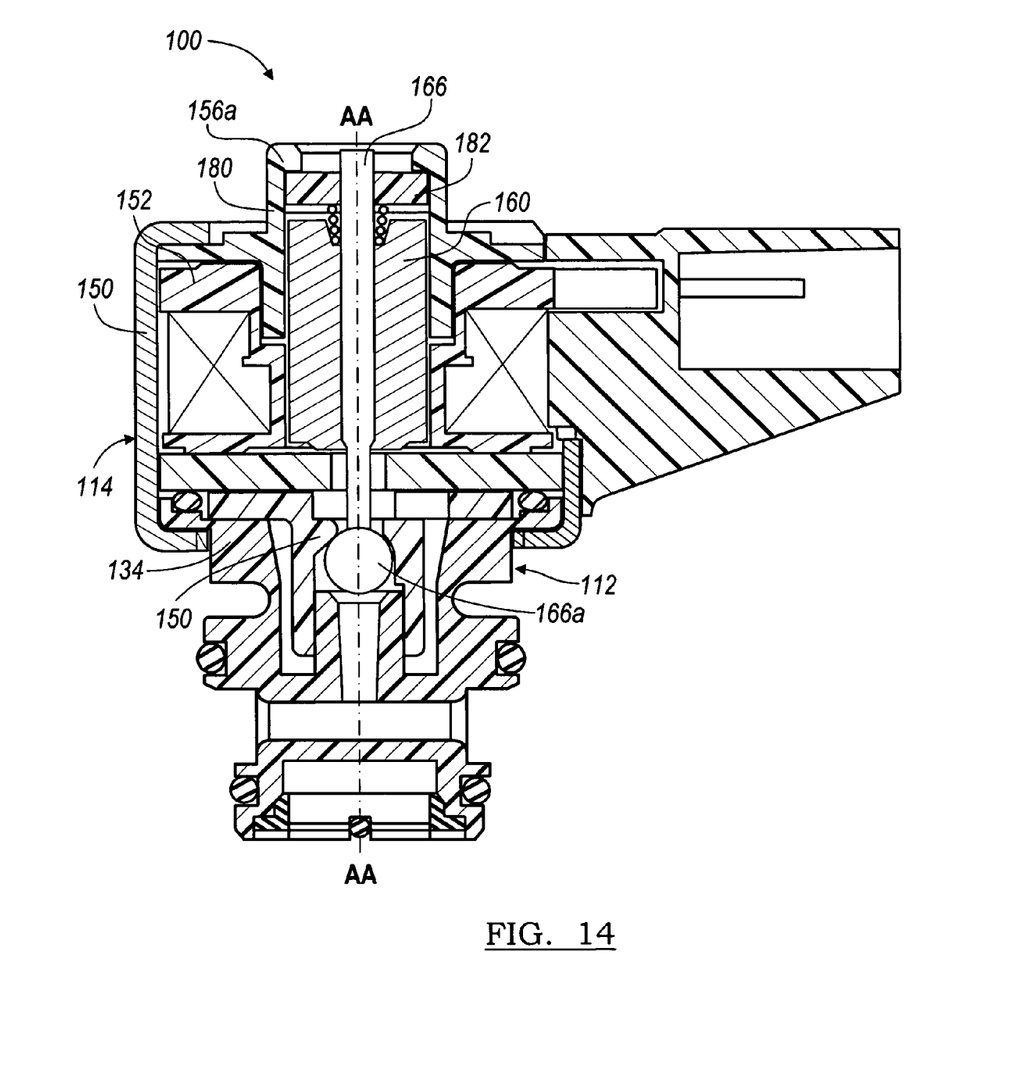
FIG. 14 is a sectional view of an alternate embodiment of a solenoid control valve of the present invention.

Referring specifically to FIG. 14, there is shown an on/off type solenoid control valve 100, in accordance with an alternative embodiment of the present invention. Control valve 100 preferably includes a fluid control body 112 and a solenoid portion 114. Similar to the above embodiment, a plastic valve ball retaining portion is shown at 134 engaging a casing member 150, and holds the unit together to the fluid control body 112. However, in this embodiment, a separate flux tube member 156a is preferably provided, rather than the integral flux tube as shown in the previously described embodiment. The flux tube member 156a preferably includes a support structure 180, which supports a bearing 182 therein. The stepped bobbin arrangement 152 is also similar to the previously described embodiment. Differing in this embodiment, however, is an armature 160, which preferably includes an actuating rod 166, which preferably extends through the entire core of the armature 160 and exits along the axis A-A on the side opposing the valve member 166a. The bearing 182 of support structure 180 preferably slidingly guides the rod 166 during actuation of the armature 160. This allows for back end guidance adjacent the bobbin 152. With this structure in place, the flux tube member 156a can be closer to the armature 160, which provides improved magnetic characteristics, particularly in high-pressure solenoid control valve applications.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A solenoid fluid control valve, comprising:
   a fluid control body adapted for being received in a fluid housing, said fluid control body including a central cavity, and having a radially extending pressure supply passage and a pressure control passage;
   a feed supply tube positioned in said central cavity, said feed supply tube including an outer diameter in direct communication with said pressure control passage, and including an inner bore forming a portion of said pressure supply passage, said feed supply tube being supported in said central cavity of said fluid control body by at least one flying buttress structure interposed therebetween, said feed supply tube including a valve seat receiving area;
   a valve seat portion being made of a plastic material and press fit onto said valve seat receiving area to form a valve receiving chamber, said valve seat portion including a valve seat and a passage in communication between said valve seat and said pressure control passage;
   a valve contained in said valve receiving chamber for closing off communication between said pressure supply passage and said pressure control passage; and
   a solenoid for opening said valve in response to a signal.

2. The invention according to claim 1, wherein said solenoid includes a central axis and has a coil wound around a bobbin, spaced from and positioned around said central axis, said coil having radially stepped radial inner diameters.

3. The invention according to claim 2, further comprising a casing member for attaching said solenoid to said control body, a portion of said casing member extending into the stepped portion of said coil for forming a flux tube therein, said bobbin including a C-shaped integrally molded retention ring.

4. The invention according to claim 3, further comprising an armature axially movable within said bobbin.

5. The invention according to claim 4, wherein said armature includes at least one area defining a pressure relief vent formed thereon.

6. The invention according to claim 4, further comprising a pole piece adjacent said armature interposed between said bobbin and said fluid control body.

7. The invention according to claim 6, further comprising a control rod extending along said central axis and through said pole piece for opening of said valve.

8. The invention according to claim 6, said valve seat portion further comprising at least one wing member in proximity to said pole piece, and wherein at least one tolerance of said valve seat portion is maintained such that the distance between said valve seat and the upper surfaces of said at least one wing member in proximity to said pole piece is maintained within a tolerance of ±0.025 mm.

9. The invention according to claim 1, wherein said solenoid fluid control valve is a ball valve.

10. A solenoid fluid control valve, comprising:
    a fluid control body adapted for being received in a fluid housing, said fluid control body including a central cavity, and having a radially extending pressure supply passage and a pressure control passage;
    a feed supply tube positioned in said central cavity, said feed supply tube including an outer diameter in direct communication with said pressure control passage, and including an inner bore forming a portion of said pressure supply passage, said feed supply tube being supported in said central cavity of said control body by at least one flying buttress structure interposed therebetween, said feed supply tube including a valve seat receiving area;
    a valve seat portion being made of a plastic material and press fit onto said valve seat receiving area to form a valve receiving chamber, said valve seat portion including a valve seat and a passage in communication between said valve seat and said pressure control passage;
    a valve contained in said valve receiving chamber for closing off communication between said pressure supply passage and said pressure control passage;
    a solenoid for opening said valve in response to a signal, said solenoid including a central axis and having a coil wound around a bobbin, spaced from and positioned around said central axis, said coil having radially stepped radial inner diameters;
    a casing member for attaching said solenoid to said control body; a portion of said casing member extending into the stepped portion of said coil for forming a flux tube therein, said bobbin including a C-shaped integrally molded retention ring; and an armature axially movable within said bobbin.

11. The invention according to claim 10, wherein said armature includes at least one area defining a pressure relief vent formed thereon.

12. The invention according to claim 10, further comprising a pole piece adjacent said armature and interposed between said bobbin and said fluid control body.

13. The invention according to claim 12, further comprising a control rod extending along said central axis and through said pole piece for opening of said valve.

14. The invention according to claim 10, said valve seat portion further comprising at least one wing member in proximity to said pole piece, and wherein at least one tolerance of said valve seat portion is maintained such that the distance between said valve seat and the upper surfaces of said at least one wing member in proximity to said pole piece is maintained within a tolerance of ±0.025 mm.

15. The invention according to claim 10, wherein said solenoid fluid control valve is a ball valve.

16. A solenoid fluid control valve, comprising:
a fluid control body adapted for being received in a fluid housing, said fluid control body including a central cavity, and having a radially extending pressure supply passage and a pressure control passage;
a feed supply tube positioned in said central cavity, said feed supply tube including an outer diameter in direct communication with said pressure control passage, and including an inner bore forming a portion of said pressure supply passage, said feed supply tube including a valve seat receiving area;
a valve seat portion being made of a plastic material and press fit onto said valve seat receiving area to form a valve receiving chamber, said valve seat portion including a valve seat and a passage in communication between said valve seat and said pressure control passage;
a valve contained in said valve receiving chamber for closing off communication between said pressure supply passage and said pressure control passage;
a solenoid for opening said valve in response to a signal, said solenoid including a central axis and having a coil wound around a bobbin, spaced from and positioned around said central axis, said coil having radially stepped radial inner diameters;
a casing member for attaching said solenoid to said control body;
a pole piece adjacent said armature and interposed between said bobbin and said fluid control body;
a flux tube secured by said casing member, said flux tube including a support portion extending therefrom; and
an armature axially movable within said bobbin.

17. The invention according to claim 16, wherein said armature includes at least one area defining a pressure relief vent formed thereon.

18. The invention according to claim 16, wherein said armature includes an axially extending rod portion extending from said armature into said support.

19. The invention according to claim 18, further comprising a bearing secured in said support wherein said rod portion slidingly extends through said bearing portion, said bearing stabilizing the movement of said armature.

20. The invention according to claim 16, said valve seat portion further comprising at least one wing member in proximity to said pole piece, and wherein at least one tolerance of said valve seat portion is maintained such that the distance between said valve seat and the upper surfaces of said at least one wing member in proximity to said pole piece is maintained within a tolerance of ±0.025 mm.

21. The invention according to claim 16, wherein said solenoid fluid control valve is a ball valve.

* * * * *